US012769058B2

(12) United States Patent
Ducloux et al.

(10) Patent No.: US 12,769,058 B2
(45) Date of Patent: Oct. 20, 2026

(54) POLARIZATION ORIENTING AND FILTERING DEVICE

(71) Applicant: EXAIL SAS, Saint-Germain-en-Laye (FR)

(72) Inventors: Eric Ducloux, Saint-Germain-en-Laye (FR); Adrien Steib, Saint-Germain-en-Laye (FR); Thomas Villedieu, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 293 days.

(21) Appl. No.: 18/566,872

(22) PCT Filed: Jun. 2, 2022

(86) PCT No.: PCT/EP2022/065131

§ 371 (c)(1),
(2) Date: Dec. 4, 2023

(87) PCT Pub. No.: WO2022/253987

PCT Pub. Date: Dec. 8, 2022

(65) Prior Publication Data

US 2024/0264376 A1 Aug. 8, 2024

(30) Foreign Application Priority Data

Jun. 4, 2021 (FR) ...................................... 2105915

(51) Int. Cl.
*G02B 6/255* (2006.01)
*G01C 19/72* (2006.01)

(52) U.S. Cl.
CPC ......... *G02B 6/2555* (2013.01); *G01C 19/721* (2013.01)

(58) Field of Classification Search
None
See application file for complete search history.

(56) References Cited

U.S. PATENT DOCUMENTS 5,187,757 A * 2/1993 Ohno .................. G01C 19/721 385/11
5,373,361 A * 12/1994 Poisel .................. G01C 19/721 356/466

(Continued)

FOREIGN PATENT DOCUMENTS

WO 0223260 A1 3/2002

OTHER PUBLICATIONS

International Search Report for PCT/EP2022/065131 mailed Aug. 12, 2022, 5 pages.

(Continued)

*Primary Examiner* — Jerry Rahll
(74) *Attorney, Agent, or Firm* — NIXON & VANDERHYE

(57) ABSTRACT

This relates to a fiber-optic polarization orienting and filtering device including a first single-mode optical fiber, having a downstream end, and a polarizing optical fiber, having a first end and a second end, characterized in that the device further includes: a first rigid opto-mechanical linking region connecting the downstream end of the first single-mode optical fiber and the first end of the polarizing optical fiber along a first linking axis; and an orientation adjusting system, the system being suitable for adjusting the angular position of the first linking region about the first linking axis.

13 Claims, 5 Drawing Sheets

(56) References Cited

U.S. PATENT DOCUMENTS

| | | | | |
|---|---|---|---|---|
| 6,211,957 | B1 * | 4/2001 | Erdogan | G02B 6/2766 385/11 |
| 6,396,965 | B1 * | 5/2002 | Anderson | G02B 6/274 385/11 |
| 2002/0051598 | A1 * | 5/2002 | Atoji | G02B 6/34 385/11 |
| 2003/0165283 | A1 * | 9/2003 | Huang | G02B 6/2551 385/11 |
| 2010/0073681 | A1 | 3/2010 | Qiu et al. | |

OTHER PUBLICATIONS

Written Opinion of the ISA for PCT/EP2022/065131 mailed Aug. 12, 2022, 8 pages.

* cited by examiner

POLARIZATION ORIENTING AND FILTERING DEVICE

CROSS-REFERENCE TO RELATED APPLICATIONS

This application is the US national stage of PCT/EP2022/065131, filed Jun. 2, 2022 and designating the United States, which claims the priority of FR FR2105915, filed Jun. 4, 2021. The entire contents of each foregoing application are incorporated herein by reference.

BACKGROUND OF THE INVENTION

Field of the Invention

The present invention generally relates to the polarization filtering of light signals in devices using guided optics.

It more particularly relates to a fibre-optic polarization filtering and orientation device comprising a first single-mode fibre SM1 and a polarizing optical fibre PZ.

The invention finds application in many fields involving guided optics, such as telecommunications, lasers, sensors or also interferometry.

It also relates to a method for the polarization filtering and orientation of light signals, implemented by the device according to the invention.

Description of the Related Art

CROSS-REFERENCE TO RELATED APPLICATIONS

This application is the US national stage of PCT/EP2022/065131, filed Jun. 2, 2022 and designating the United States, which claims the priority of FR FR2105915, filed Jun. 4, 2021. The entire contents of each foregoing application are incorporated herein by reference.

In many applications involving light signals, it is often necessary to polarize these signals or to change their polarization.

Polarization manipulation is often performed thanks to the use in free-field condition of non-fibre optic polarizing components, for example polarizers, prisms or wave plates.

When the light signals in question come from guided optics components such as optical fibres, there exist component alignment and signal loss problems that make the use of high-performance components sub-optimal. FIG. 1 illustrates an optical bench using such light signals coupled to non-fibre polarizing optical components. The optical bench is illuminated by an input light signal propagating through an input fibre $F_E$. A lens L1 collimates the input light signal, then the collimated light signal passes through a polarizer P. A second lens L2 refocuses the light signal towards an output fibre $F_S$, producing an output light signal. Rotating both the input fibre $F_E$ by a rotation $R_E$ and the output fibre $F_S$ by a rotation $R_S$ makes it possible to adjust the polarization of the output light signal.

There exist fibre components, as the polarization-maintaining fibres or the polarizing fibres, or also other complex fibre components that integrate all the collimation or coupling optical components.

DISCLOSURE OF THE INVENTION

In order to overcome the above-mentioned difficulties, the present invention proposes to use fibre polarizing components in order to work in an "all-fibre" configuration and facilitate polarization manipulation of signals coming from guided optics components, in particular optical fibres.

More particularly, it is proposed according to the invention a fibre-optic polarization filtering and orientation device, comprising:

- a first single-mode optical fibre, having a downstream end,
- a polarizing optical fibre, having a first end and a second end, characterized in that the device further comprises:
- a first end of the rigid optomechanical connection area connecting the downstream end of the first single-mode and the first end of the polarizing optical fibre along a first connection axis,
- a system for adjusting the orientation of the first rigid optomechanical connection area about the first connection axis, the system being adapted to adjust the angular position of the first connection area about the first connection axis.

Advantageously, the first rigid optomechanical connection area is formed by welding. In this case, the first rigid optomechanical connection area can be covered with a splice protection.

Advantageously, the polarizing optical fibre has a birefringence and a main signal loss rate along a main polarization axis $A_p$ and a transverse signal loss rate along a transverse polarization axis $A_t$, where the transverse signal loss rate is higher by at least 20 dB than the main signal loss rate.

In a preferred embodiment, the device further comprises:

- a second single-mode optical fibre, having an upstream end,
- a second rigid optomechanical connection area connecting the second end of the polarizing optical fibre and the upstream end of the second single-mode optical fibre along a second connection axis, wherein the orientation adjustment system is also adapted to adjust the angular position of the second connection area about the second connection axis.

Advantageously, the polarizing optical fibre is arranged as a loop.

Advantageously, the polarizing optical fibre has a length between 1 and 30 metres.

Advantageously, the orientation adjustment system is motorized.

Advantageously, the device according to the invention further comprises a servo system for controlling the orientation adjustment of at least one of the first rigid optomechanical connection area and the second rigid optomechanical connection area according to a setpoint value.

In a preferred embodiment, the fibre-optic device further comprises a casing, a first connection opening and a second connection opening.

In this embodiment, the first connection opening and the second connection opening can comprise respectively a first optical bulkhead and a second bulkhead. As an alternative, the first connection opening comprises an optical bulkhead and the second connection opening comprises a collimator for optical fibre.

The invention also relates to a method for the polarization filtering and polarization orientation of an input light signal, implemented by a fibre-optic polarization filtering and orientation device according to the invention, comprising the following steps:

- positioning an optical system providing a light flux at the input of the first single-mode fibre, at least a portion of whose light flux forms an input light signal entering and propagating into the first single-mode fibre, selecting a polarization of the input light signal to be filtered by adjusting the orientation of the first rigid optomechanical connection area about the first connection axis.

The polarization filtering and orientation method can be implemented in a fibre-optic gyroscope, said fibre gyroscope comprising:

a light source, a Sagnac interferometer, an input/output port coupled to said Sagnac interferometer, an optical coupler coupling, upstream, using an upstream fibre, the light source to said downstream input/output port, using a downstream single-mode fibre, wherein:

the optical system comprises said optical coupler and the light source, the first single-mode fibre is connected to the downstream single-mode fibre of the optical coupler, the polarizing fibre of the fibre-optic polarization filtering and orientation device is connected to the input/output port.

The invention also relates to a method for the polarization filtering of an input light signal and the polarization orientation of an output light signal, implemented by a fibre-optic polarization filtering and orientation device according to the invention, comprising the following steps:

positioning an optical system providing a light flux at the input of the first single-mode fibre, at least a portion of the whose light flux forms an input light signal entering and propagating into the first single-mode fibre and then into the polarizing fibre, selecting a polarization of the input light signal to be filtered by adjusting the orientation of the first rigid optomechanical connection area about the first connection axis, selecting the polarization orientation of the output light signal by adjusting the orientation of the second rigid optomechanical connection area about the second connection axis.

The different features, alternatives and embodiments of the invention can be associated with each other according to various combinations, insofar as they are not incompatible or exclusive with respect to each other.

BRIEF DESCRIPTION OF THE DRAWINGS

The following description in relation with the appended drawings, given by way of non-limiting examples, will allow a good understanding of what the invention consists of and of how it can be implemented.

In the appended drawings.

DETAILED DESCRIPTION

Figure 8:
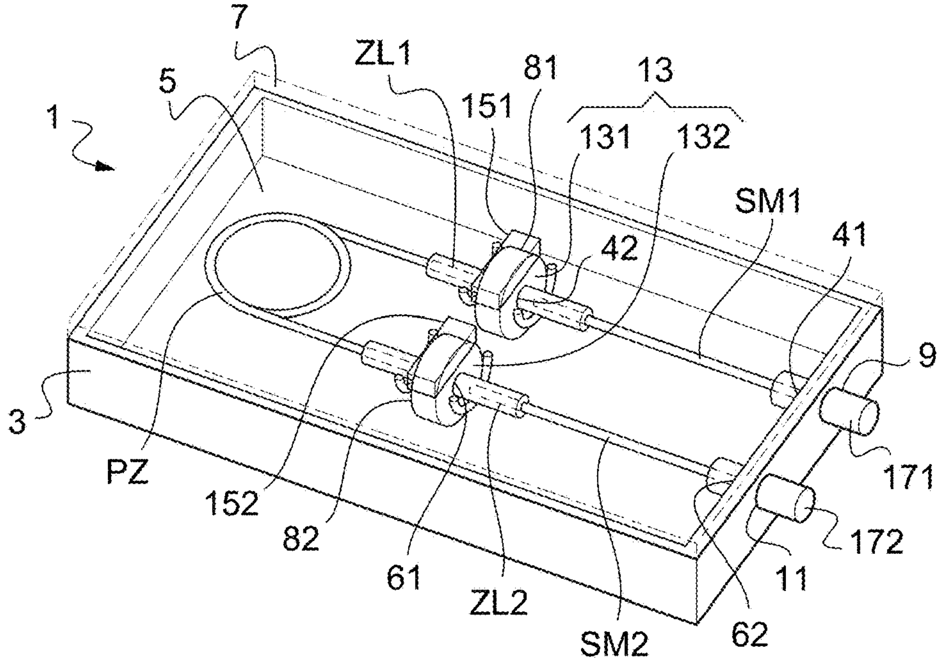
FIG. 8 is a schematic view of an embodiment of the fibre-optic polarization filtering and orientation device according to an exemplary embodiment.

FIG. 8 shows a three-dimensional view of a fibre-optic device 1 according to the invention. Such a device is intended to filter, from an input light signal, a signal having any polarization to output a signal having a linear polarization with a determined orientation.

In the following description, it is meant by "single-mode optical fibre" a transverse single-mode fibre, denoted SM, i.e. a fibre that can include two types of polarization without distinguishing them from each other through the fibre structure, and that is different from a polarization-maintaining fibre, denoted PM (i.e. a fibre arranged to separate two transverse polarization modes of a light signal and to maintain the two transverse polarization modes), or polarizing optical fibre, denoted PZ, as mentioned hereinabove.

The device comprises a first single-mode optical fibre SM1 having an upstream end 41 and a downstream end 42.

The device 1 further comprises a polarizing fibre PZ having a first end 81 and a second end 82. The polarizing fibre PZ has a structure inducing in the core a birefringence, that determines a main polarization axis $A_p$ and a transverse polarization axis $A_t$, orthogonal to each other.

The birefringence and optical guiding in the fibre result from index and birefringence profiles determined inside the fibre, coming respectively from the dopant concentrations introduced into the silica and from the stress field deliberately generated during preform pulling. The index and birefringence profiles of the fibre induce in the latter a main signal loss rate for a light signal having a linear polarization along the main polarization axis Ap and a transverse signal loss rate for a light signal having a linear polarization along the transverse polarization axis At. The transverse signal loss rate is higher than the main signal loss rate. For example, the difference between the main and transverse signal loss rates is of 20 dB. As another example, the difference between the main and transverse signal loss rates is between 20 dB and a value that may be higher than 90 dB.

The difference between the main and transverse signal loss rates, in other words the polarization filtering effect, depends on the length of the polarizing fibre PZ, but also, as the case may be, on a wound configuration of the fibre PZ and in particular the radius of curvature of the wound configuration.

Therefore, the propagation of a light signal having a linear polarization along the main polarization axis in the polarizing fibre PS is favoured, whereas a light signal having a linear polarization along the transverse polarization axis is attenuated and extinguished during its propagation in the polarizing fibre PZ. A light signal having a linear polarization along the main polarization axis is called slow mode. A light signal having a linear polarization along the transverse polarization axis is called fast mode. Any optical signal is thus filtered by the polarizing optical fibre PZ over a determined wavelength range. In other words, the polarizing fibre PZ is arranged to transmit a linear polarization mode, preferably a polarization mode oriented along the main polarization axis $A_p$ of the light signal. Preferably, the polarizing fibre PZ is also arranged to extinguish or suppress another linear polarization mode, preferably a polarization mode $A_t$ transverse to the main polarization axis of the light signal.

The term “filtered” by the polarizing optical fibre PZ is here understood as being “transmitted” by the polarizing optical fibre PZ. Therefore, according to the present disclosure, the polarizing optical fibre PZ is arranged to filter the polarization of the light signal that propagates along the polarizing fibre PZ.

Figure 3:
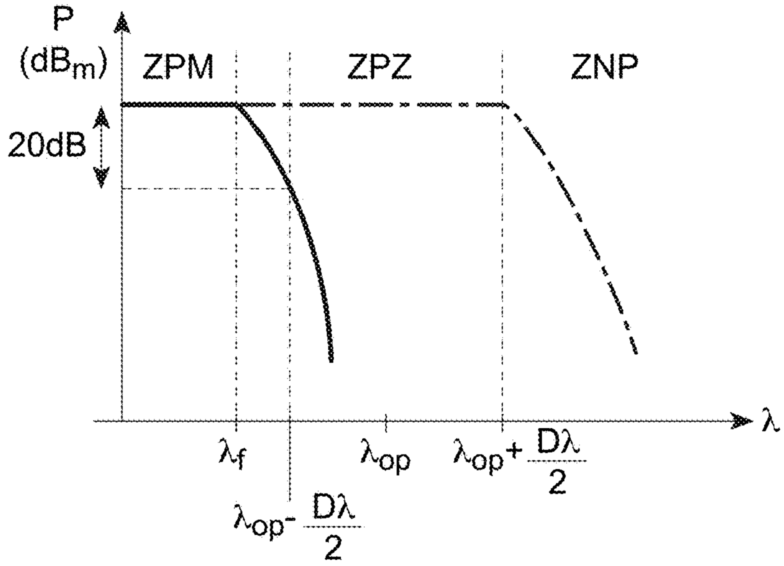
FIG. 3 illustrates the operation of a polarizing fibre.

FIG. 3 illustrates the operating mode of the polarizing optical fibre PZ. It shows the power evolution of the slow mode (in mixed lines) and respectively the fast mode (in solid lines) as a function of the wavelength.

In the area ZPM, the polarizing optical fibre PZ acts as a polarization-maintaining fibre, where the low and fast modes propagate simultaneously. The fast mode power attenuation begins for wavelengths higher than $\lambda_f$.

The area ZPZ is delimited between the wavelength for which the polarizing optical fibre PZ filtrates the slow mode and where the power difference between the slow mode and the fast mode is higher than 20 dB, i.e. $\lambda_{op}$-D$\lambda$/2, and the wavelength for which the slow mode power attenuation begins, i.e. $\lambda_{op}$+D$\lambda$/2. For example, the wavelength $\lambda_{op}$ can be equal to 1550 nm, and D$\lambda$ can be of the order of a few tens of nanometres, for example of the order of 50 nm. In another example, D$\lambda$ is of the order of 150 nm. Indeed, the quantity D$\lambda$ depends on the length of the polarizing fibre PZ, and, as the case may be, on the radius of curvature in wound configuration of the polarizing fibre PZ. In this area, the polarizing fibre can reach filtering characteristics far higher than those of the more conventional devices. For example, the polarizing fibre PZ can have an extinction rate higher than 90 dB, whereas extinction rates of about 40 dB are reached by conventional devices.

The area ZNP corresponding to wavelengths higher than $\lambda_{op}$+D$\lambda$/2 is an area in which the two low and fast modes are leakage modes and in which there is no propagation in the polarizing optical fibre PZ.

For example, the polarizing fibre PZ can be of the “elliptic” type and comprises, from the inside to the outside: a single-mode core of index $n_{core}$, a circular cladding of refractive index $n_{cladding}$ lower than $n_{core}$, a cladding of elliptic cross-section and refractive index $n_{elliptic}$ higher than $n_{cladding}$. A configuration is for example: a single-mode germano-silicate core, of index 7.10¯3 above the refractive index of silica for a wavelength of 633 nm; a circular silica cladding (called buffer cladding); a cladding of elliptic cross-section made of silica co-doped with boron, phosphorus and fluorine (i.e. boro-phosphoro-fluoro-silicate) and of index 10.10¯3 below the refractive index of silica for a wavelength of 633 nm.

In the preferred embodiment, the polarizing optical fibre PZ is arranged to maintain a polarization mode (oriented along the main polarization axis $A_p$ of the light signal) and to extinguish the other (transverse to the main polarization axis $A_p$). As an alternative, the polarizing fibre PZ can be of any other type, as long as it provides a single-mode guidance of the light signal and the selection of a single one of the two orthogonal polarizations (which is preferably the polarization mode that is oriented along the main polarization axis $A_p$). On the other hand, the single-mode optical fibre is arranged to transmit or transport identically two transverse polarization modes of the light signal. That way, the single-mode fibre according to the present disclosure does not affect the polarization state of the light signal propagating in the single-mode fibre. It is hence not a polarizing fibre PZ in the sense of the present disclosure. The single-mode fibre according to the present disclosure can be a so-called “non-polarized” fibre, unlike the polarizing fibre PZ as described in the present disclosure.

Figure 4:
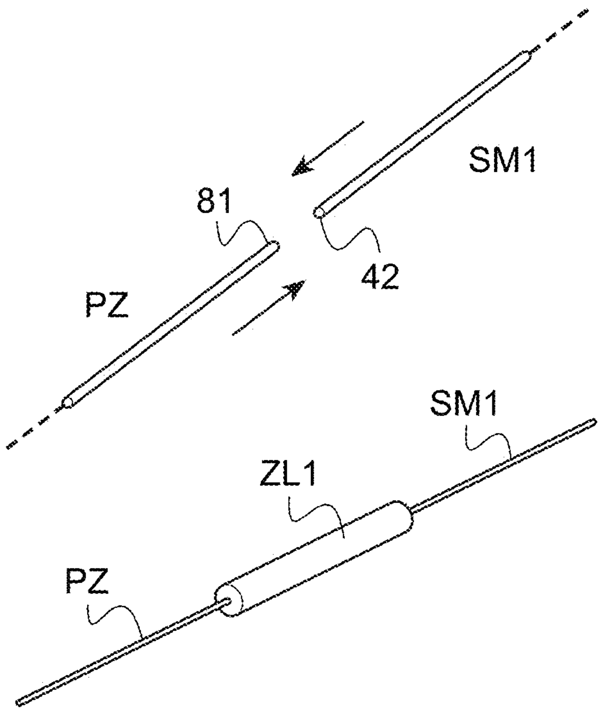
FIG. 4 illustrates the principle of welding two optical fibres and putting a splice protection around the rigid optomechanical connection area obtained by this welding.

As illustrated in FIG. 4, the downstream end 42 of the first single-mode fibre SM1 is connected to the first end 81 of the polarizing optical fibre PZ, forming a first rigid optomechanical connection area ZL1, along a first connection axis D1. For example, the downstream end 42 of the first single-mode fibre SM1 and the first end 81 of the polarizing optical fibre PZ are connected by welding. Therefore, the connection is equivalent to a polarizer—free field connection, except that it is an all-fibre connection. FIG. 4 shows a step of welding, for example, between the end 42 of the first single-mode fibre SM1 and the first end 81 of the polarizing optical fibre PZ, on an optical welding machine not shown.

In the case where the downstream end 42 of the first single-mode fibre SM1 and the first end 81 of the polarizing optical fibre PZ are connected by welding, the first rigid optomechanical connection area ZL1 can be covered with a splice protection. The splice protection ensures the mechanical holding of the first rigid optomechanical connection area ZL1.

The first rigid optomechanical connection area ZL1 is defined as a zone including a portion of the first single-mode fibre SM1 containing the downstream end 42 and a portion of the polarizing fibre PZ containing the first end 81, the two portions being connected to each other.

The device 1 moreover comprises an adjustment system 13 for orienting respectively the first rigid optomechanical connection area ZL1. The adjustment system 13 allows adjusting the angular position of the first connection area ZL1 about the first connection axis D1.

It should be specified that, due to the definition of the first rigid optomechanical connection area ZL1, the angular position of the latter determines that of the first end PZ1 of the polarizing optical fibre PZ.

Figure 5:
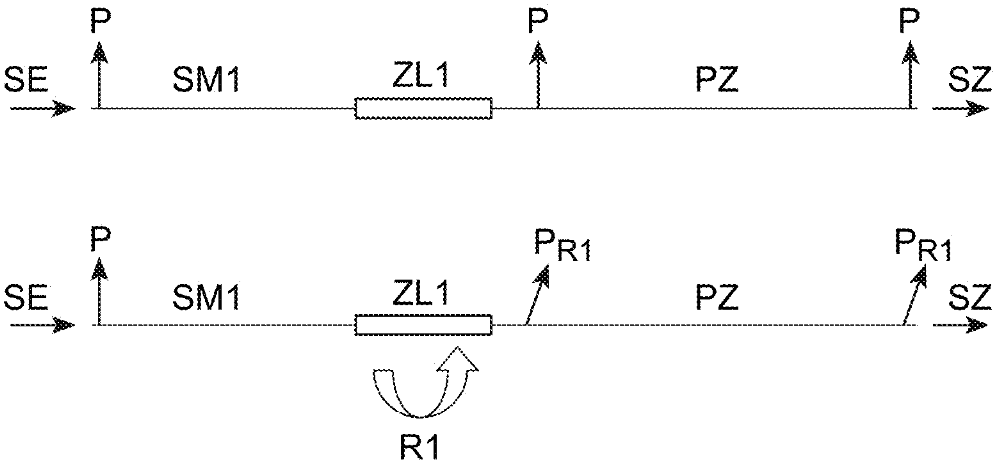
FIG. 5 illustrates the principle of linear polarization orientation according to the present disclosure in the exemplary embodiment of FIG. 2.

Therefore, as illustrated in FIG. 5, the adjustment of the angular position of the first connection area ZL1 makes it possible to choose the orientation of the linear polarization filtered by the polarizing fibre PZ at its first end 81. That way, according to the present disclosure, the light signal has a linear polarization whose orientation is modulable as a function of the angular position adjustment of the first connection area ZL1.

FIG. 5 shows how a light signal SE having a polarization P propagating in the first single-mode optical fibre SM1 is transformed into a light signal SZ propagating in the polarizing optical fibre PZ and having a polarization PR1 with a different orientation after a rotation R1 of the first rigid optomechanical connection area ZL1. For simplicity of representation, the input polarization P has been represented as a linear polarization, only the projection of which on the slow axis of the fibre PZ is filtered. However, the input polarization P can be any polarization that will keep in guided mode in the fibre PZ only its linear part aligned with the slow axis, this axis being driven by the mechanical rotation of the rigid optomechanical connection ZL1.

Figure 1:
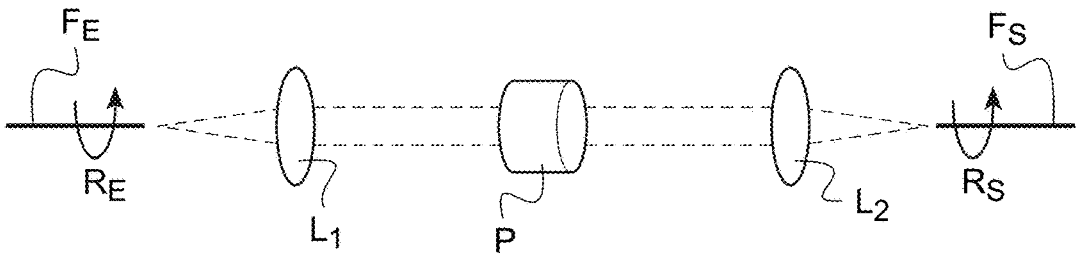
FIG. 1 illustrates an optical bench using such light signals coupled to non-fibre polarizing optical components.
Figure 2:
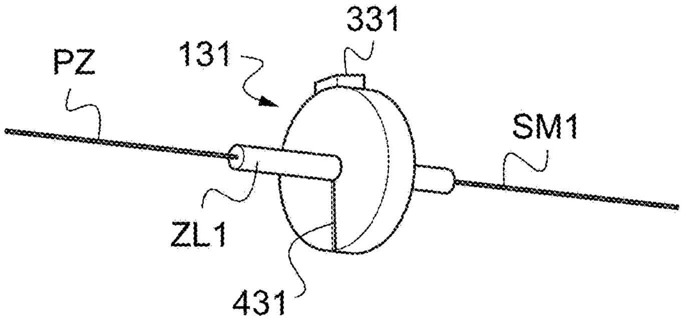
FIG. 2 is a schematic view of an embodiment of the fibre-optic polarization filtering and orientation device according to an exemplary embodiment.

For example, as shown in FIG. 2, the adjustment system 13 can be composed of a first wheel 131 surrounding the first rigid optomechanical connection area ZL1.

We will now describe in more detail how, for example, the first single-mode fibre SM1, the polarizing optical fibre PZ as well as the first rigid optomechanical connection area ZL1 and the second rigid optomechanical connection area ZL2 can be inserted into the first wheel 131.

Figure 6:
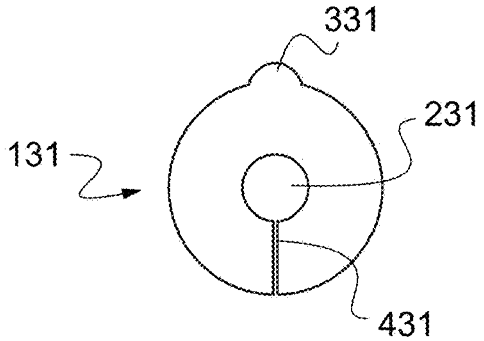
FIG. 6 illustrates an embodiment of an adjustment system according to the invention.

The first wheel 131 is a roller with a first central hole 231, a first lug 331 and a first thin slot 431 as shown in FIG. 6.

Figure 7:
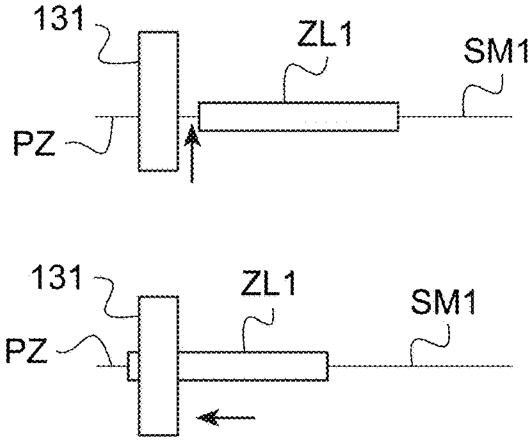
FIG. 7 illustrates a mounting principle of the rigid optomechanical connection of FIG. 4 in the embodiment of the adjustment system of FIG. 6.

A user inserts the part of the polarizing optical fibre PZ located on one side of the first rigid optomechanical connection area ZL1 in the first central hole 231 of the first wheel 131, as illustrated in FIG. 7. The inner diameter of the first central hole 231 is adjusted to the external diameter of the connection area ZL1. Once brought at the first central hole 231 of the first wheel 131, the first rigid optomechanical connection area ZL1 is pushed into the first central hole 231 to be attached thereto, for example by gluing. The first lug 331 allows rotating the first wheel 131.

Advantageously, the adjustment system 13 makes it possible to adjust in continuous the angular position of the first connection area ZL1.

Advantageously, the only torsional stresses undergone by the first single-mode optical fibre SM1 are located respectively at the first rigid optomechanical connection area ZL1.

It can be noted that these torsional stresses have no effect on light signals having a linear polarization propagating in the first single-mode optical fibre SM1.

Indeed, these torsional stresses induce a circular birefringence defining two propagation modes with symmetrical circular polarizations. Therefore, at the first end 81 of the polarizing optical fibre PZ, this circular birefringence causes only a whole rotation of orientation of the input polarization P without loss on the signal polarization degree.

Advantageously, the adjustment system 13 can be motorized. For example, if the adjustment system 13 comprises a first wheel 131, the latter can be driven by a first motor.

The device 1 can comprise in this case a servo system 21 (not shown) for controlling the orientation adjustment of the first rigid optomechanical connection area ZL1 according to a setpoint value. The servo system then comprises a control unit 23 (not shown) adapted to control the operation of the motorized adjustment system 3.

In an embodiment, the fibre-optic polarization filtering and orientation device 1 further includes a second single-mode optical fibre SM2 having an upstream end 61 and a downstream end 62. An implementation of this embodiment is illustrated in FIG. 8.

The second end 82 of the polarizing fibre PZ is connected to the upstream end 61 of the second single-mode fibre SM2, forming a second rigid optomechanical connection area ZL2, along a second connection axis D2. For example, the second end 82 of the polarizing optical fibre PZ and the upstream end 61 of the second single-mode fibre SM2 are connected by a welding, similarly to that illustrated in FIG. 4 for the first rigid optomechanical connection area ZL1. Likewise, the connection is equivalent to a polarizer—free field connection, except that it is an all-fibre connection and it avoids alignment problems.

The second rigid optomechanical connection area ZL2 is defined as an area including a portion of the second single-mode fibre SM2 containing the downstream end 61 and a portion of the polarizing fibre PZ containing the second end 82, the two portions being connected to each other.

In the case where the downstream end 82 of the polarizing optical fibre PZ and the upstream end 61 of the second single-mode fibre SM2 are connected by welding, the second rigid optomechanical connection area ZL2 can be covered with a splice protection. The splice protection ensures the mechanical holding of the second rigid optomechanical connection area ZL2.

Typically, a rigid and cylindrical protection rod can serve as a splice protection for each of the first rigid optomechanical connection area ZL1 and the second rigid optomechanical connection area ZL2. FIG. 4 shows the positioning of a rigid and cylindrical protection bar surrounding the first rigid optomechanical connection area ZL1.

Then, we consider the embodiment in which the fibre-optic polarization filtering and orientation device 1 further comprises a second single-mode optical fibre SM2.

Advantageously, the polarizing optical fibre PZ is arranged as a loop. The radius of curvature of the loop is of the order of about ten centimetres. The number of turns is defined by the length of the polarizing optical fibre PZ. For example, for a fibre of 10 metres length and 7 cm of loop diameter, the number of turns is of the order of 50. This configuration makes it possible to obtain a better filtering of the polarization filtered by the polarizing optical fibre PZ. Indeed, the polarization filtering effect varies in response to stress on the polarizing optical fibre PZ, caused by the curvature thereof.

Therefore, when the polarizing optical fibre PZ is arranged as a loop, the device 1 is more compact.

If the polarizing optical fibre is too short, the filtering of the filtered polarization is not efficient enough. If the polarizing optical fibre PZ is too long, the losses of the filtered polarization signal are too high. Preferentially, the polarizing optical fibre PZ has a length between 1 and 30 metres. Also preferentially, the polarizing optical fibre PZ has a length between 5 and 15 metres.

Preferentially, the first single-mode fibre SM1 and the second single-mode fibre SM2 are arranged in such a way as to minimize the stresses to which these latter are subjected. By "stress", it is understood any force exerted on the fibres SM1 and SM2 and tending to deform them mechanically.

Therefore, the first single-mode fibre SM1 and the second single-mode fibre SM2 are advantageously positioned in straight line, in order to avoid the stresses due to curvatures and to minimize the effect of these curvatures on the birefringence of the fibres SM1 and SM2.

Advantageously, the only mechanical pressures on the first single-mode fibre SM1 and the second single-mode fibre SM2 are located at the first rigid optomechanical connection area ZL1 and the second rigid optomechanical connection area ZL2.

The adjustment system 13 is moreover configured to orient the second rigid optomechanical connection area ZL2.

The adjustment system 13 then also allows adjusting the angular position of the second connection area ZL2 about the second connection axis D2.

Similarly to the angular position of the first rigid optomechanical connection area ZL1, the angular position of the second rigid optomechanical connection area ZL2 determines that of the second end PZ2 of the polarizing optical fibre PZ.

Indeed, as the main polarization axis $A_p$ and the transverse polarization axis $A_t$ are inherent to the geometry of the polarizing optical fibre PZ at its second end, the direction of the linear polarization filtered by the polarizing optical fibre PZ turns with a rotation of the latter about the second connection axis D2.

Figure 9:
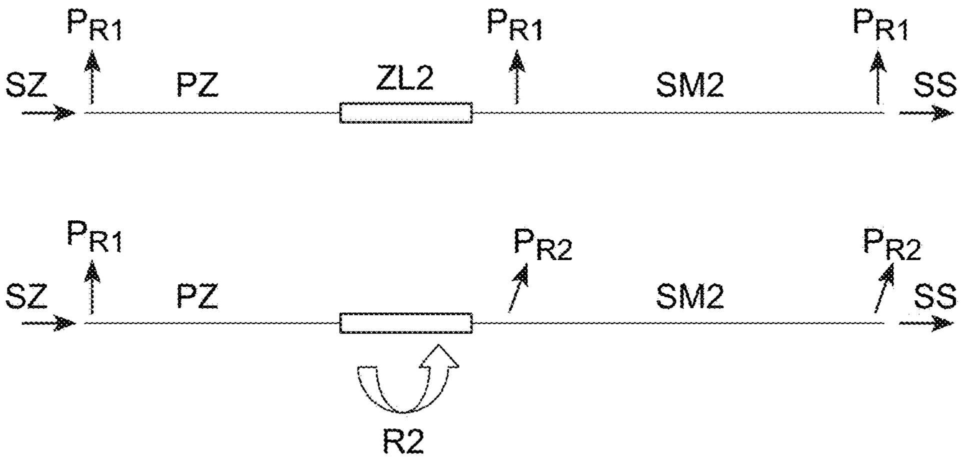
FIG. 9 illustrates a step of the principle of linear polarization orientation according to the present disclosure in the exemplary embodiment of FIG. 8.

As illustrated in FIG. 9, the adjustment of the angular position of the second connection area ZL2 makes it possible to choose the orientation of the linear polarization at the output of the polarizing optical fibre PZ and hence propagating in the second single-mode optical fibre SM2. FIG. 9 shows how a light signal SZ having a polarization $P_{R1}$ propagating in the polarizing optical fibre PZ is transformed into a light signal SS propagating in the second single-mode optical fibre SM2 and having a linear polarization $P_{R2}$ with a different orientation after a rotation R2 of the second rigid optomechanical connection area ZL2.

Preferentially, the device 1 is integrated into a casing 3. The casing 3 has a base 5, a lid 7, a first connection opening 9 and a second connection opening 11. The upstream end 41 of the first single-mode optical fibre SM1 is aligned with the first connection opening 9. The downstream end 62 of the second single-mode optical fibre SM2 is aligned with the second connection opening 11. The integration of the device 1 in such a casing 3 makes it possible to use the latter like a compact component on which a light source S can be connected.

In the case where the device 1 is integrated into a casing 3, the adjustment system 13 is mounted on the casing 3.

For example, as shown in FIG. 8, the adjustment system 13 can comprise a first wheel 131 and a second wheel 132 surrounding respectively the first rigid optomechanical connection area ZL1 and the second rigid optomechanical connection area ZL2. The rotation of the wheels 131 and 132 allows the rotation of the first rigid optomechanical connection area ZL1 and the second rigid optomechanical connection area ZL2, respectively. It also allows the adjustment of their angular position about the first connexion axis D1 and the second connexion axis D2, respectively.

An example of mounting of the device 1 will be described hereinafter. In particular, we will describe in more detail how the first single-mode fibre SM1, the polarizing optical fibre PZ and the second single-mode fibre SM2 as well as the first rigid optomechanical connection area ZL1 and the second rigid optomechanical connection area ZL2 can be inserted into the first wheel 131 and the second wheel 132, how the first wheel 131 and the second wheel 132 can be fastened to the casing 3, and how to perform the rotation of the first and second rigid optomechanical connection areas ZL1 and ZL2 using the first wheel 131 and the second wheel 132.

As hereinabove, the first wheel 131 (respectively, the second wheel 132) can be a wheel with a first central hole 231 (respectively, a second central hole 232), a first lug 331 (respectively, a second lug 332) and a first thin slot 431 (respectively, a second thin slot 432), as shown in FIG. 6.

The insertion of the first rigid optomechanical connection area ZL1 in the first wheel 131 can be performed as described herein above, in FIG. 7, i.e. in the case where the device 1 does not comprise the second single-mode fibre SM2 and the adjustment system 13 comprises a first wheel 131. By analogy, the insertion of the second rigid optomechanical connection area ZL2 can be performed in a similar way.

Figure 10:
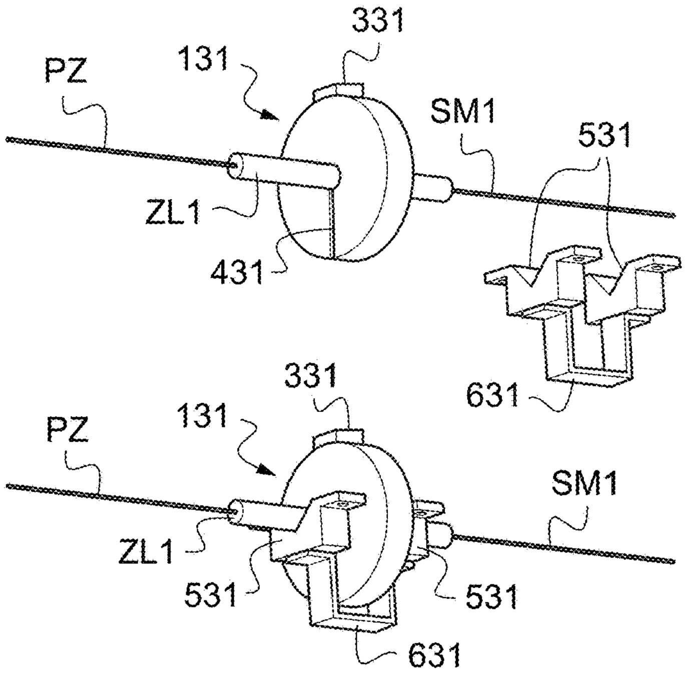
FIG. 10 illustrates an embodiment of inserting the unit formed by the rigid optomechanical connection area of FIG. 4 and the embodiment of the adjustment system of FIG. 7 in a holding system.

The first wheel 131 and the first rigid optomechanical connection area ZL1 are inserted into a first double V-shaped holding structure, illustrated in FIG. 10. The first double V-shaped holding structure comprises fastening tabs adapted to be attached on an inner face of the lid 7 of the casing 3 using screws or any other fastening means, as well as a low bar connecting the fastening tabs. The two V-shapes are designed to provide respectively two points of contact with the lid 7 and an area of friction with the rigid optomechanical connection area ZL1. This design makes it possible to obtain a low-cost mechanical strength to stabilize the positions.

In a similar way (not shown), the second wheel 132 and the second rigid optomechanical connection area ZL2 are inserted into a second double V-shaped holding structure.

Figure 11:
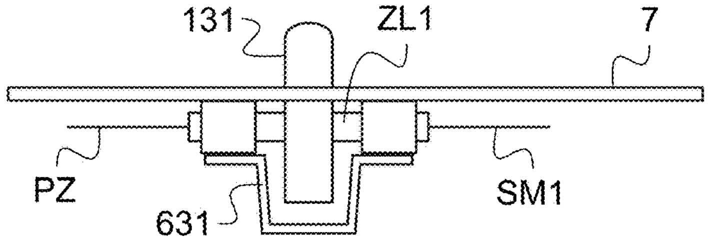
FIG. 11 shows an embodiment of fastening the unit formed by the rigid optomechanical connection area of FIG. 4, the embodiment of the adjustment system of FIG. 7, the holding system of FIG. 10 in the embodiment of the fibre-optic polarization filtering and orientation device of FIG. 8.

The first wheel 131 provided with the rigid optomechanical connection area ZL1 inserted into the first double V-shaped holding structure is then fastened under the lid 7 of the casing 3 via the fastening tabs 531, as illustrated in FIG. 11. A first opening 151 is provided in the lid 7 of the casing 3 to allow the first wheel 131 and the first lug 331 thereof to pass through the lid 7 and to drive the latter with a finger, for example.

In a similar way (not shown), the second wheel 132 provided with the rigid optomechanical connection area ZL2 inserted into the second double V-shaped holding structure is then fastened under the lid 7 of the casing 3 via fastening tabs. A second opening 152 is provided in the lid 7 of the casing 3 to allow the second wheel 132 and the second lug 332 thereof to pass through the lid 7 and to drive the latter with a finger, for example.

Figure 12:
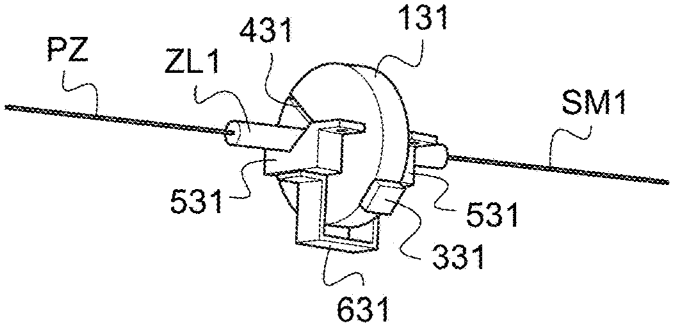
FIG. 12 illustrates an example of abutment of an embodiment of the system for adjusting a rigid optomechanical connection area according to the invention.

The first lug 331 of the first wheel 131 is used as a stop to control the rotation of the first wheel 131. The first opening 151 is wide enough to let the first lug 331 pass through during a rotation of the first wheel 131. The rotation is limited by the presence of the low bar that blocks the first wheel 131 when the first lug 331 comes into contact with the low bar, as illustrated in FIG. 12. The first lug 331 can also serve as a reference and can, for example, coincide with the orientation of the slow axis of the polarizing fibre PZ.

In a similar way (not shown), the second lug 332 of the second wheel 132 is used as a stop to control the rotation of the second wheel 132. The second opening 152 is wide enough to let the lug pass through during a rotation of the second wheel 132. The rotation is limited by the presence of the low bar that blocks the second wheel 132 when the second lug 332 comes into contact with the low bar. The second lug 332 can also serve as a reference and can, for example, coincide with the orientation of the slow axis of the polarizing fibre PZ.

Advantageously, the adjustment system 13 makes it possible to adjust in continuous the angular position of the first connection area ZL1 and the second connection area ZL2, respectively.

Advantageously, the only torsional stresses undergone by the first single-mode optical fibre SM1 and the second single-mode optical fibre SM2 are located at the first rigid optomechanical connection area ZL1 and the second rigid optomechanical connection area ZL2, respectively.

It can be noted that these torsional stresses have no effect on light signals having a linear polarization propagating in the first single-mode optical fibre SM1 and in the second optical fibre SM2, respectively.

As mentioned hereinabove, these torsional stresses induce a circular birefringence defining two propagation modes with symmetrical circular polarizations. Therefore, as hereinabove, at the first end 81 of the polarizing optical fibre PZ, this circular birefringence causes only a whole rotation of orientation of the input polarization P without loss on the signal polarization degree. At the second end 82 of the polarizing optical fibre PZ, this circular birefringence neither changes the ability to rotate the output polarization with the rotation of the rigid optomechanical connection area ZL2. The torsional stresses thus do not disturb the operation of the device 1.

The device 1 being symmetrical, it is thus possible to connect indifferently either one of the first single-mode optical fibre SM1 and the second single-mode optical fibre SM2 to an input light signal in order to obtain at the end of the other single-mode optical fibre SM2 or SM1 an output light signal having a linear polarization of determined orientation.

Advantageously, the adjustment system 13 can be motorized. For example, if the adjustment system 13 comprises a first wheel 131 and a second wheel 132, these latter can be driven by a first motor and a second motor.

The device 1 can comprise in this case a servo system 21 for controlling the orientation adjustment of the first rigid optomechanical connection area ZL1 according to a first setpoint value, and of the second rigid optomechanical connection area ZL2 according to a second setpoint value. The servo system then comprises a control unit 23 adapted to control the operation of the motorized adjustment system 3. This servo control allows controlling the polarization filtering and orientation as a function of the use of the device 1 made by the user, for example, of the desired output polarization, or of the measurement made of a parameter of a light source S.

In an alternative embodiment, the first connection opening 9 and the second connection opening 11 respectively comprise a first optical bulkhead 171 and a second optical bulkhead 172, to which are connected the upstream end 41 of the first single-mode optical fibre SM1 and the downstream end 62 of the second single-mode optical fibre SM2, respectively.

Figure 13:
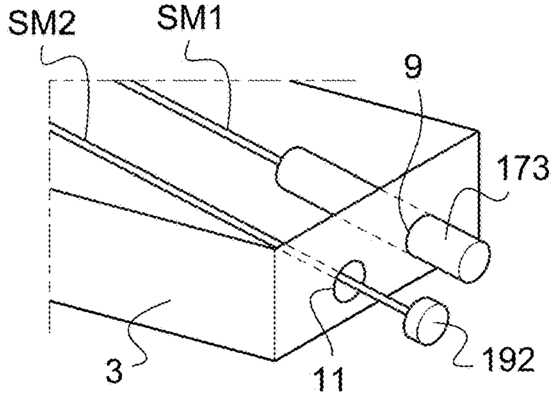
FIG. 13 and FIG. 14 illustrate alternative embodiments of the fibre-optic polarization filtering and orientation device according to the embodiment of FIG. 8.

As an alternative embodiment, as shown in FIG. 13, the first connection opening 9 comprises an optical bulkhead 173 to which is connected the upstream end 41 of the first single-mode optical fibre SM1, and the second connection opening 11 comprises a collimator for optical fibre 192, to which is connected the downstream end 62 of the second single-mode optical fibre SM2.

Figure 14:
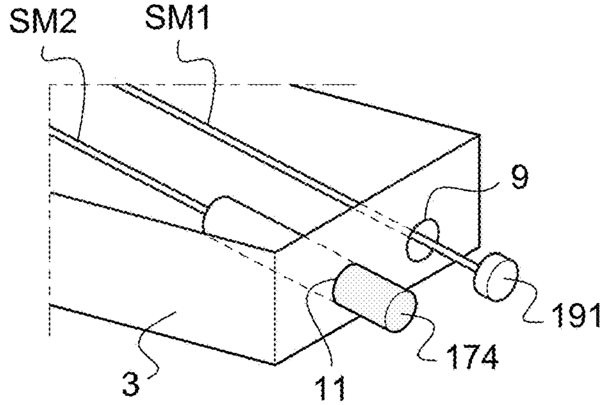

As an alternative embodiment, as shown in FIG. 14, by device symmetry, the second connection opening 11 comprises an optical bulkhead 174 to which is connected the downstream end 62 of the second single-mode optical fibre SM2, and the first connection opening 9 comprises a collimator for optical fibre 191, to which is connected the upstream end 41 of the first single-mode optical fibre SM1.

In the last two alternative embodiments, the fibre collimator can be of the SELFOC® brand. These alternative embodiments make it possible to obtain an output signal in free field and to integrate the device 1 directly into an optical bench of the free field type.

The following of the description describes how to proceed to the polarization filtering and orientation of an input light signal using the device 1 according to the invention, in the case in which the latter comprises the first single-mode fibre SM1 and the second single-mode fibre SM2, and in the case in which the latter comprises only the first single-mode fibre SM1.

Method

In a first part, it is considered that the device 1 comprises the first single-mode fibre SM1 and the second single-mode fibre SM2 and that the upstream end 41 of the first single-mode optical fibre SM1 is used as an input of the device 1 and the downstream end 62 of the second single-mode optical fibre SM2 as an output of the device 1. The symmetrical configurations of use of the device 1 are obtained using the downstream end 62 of the second single-mode optical fibre SM2 as an input of the device 1 and the upstream end 41 of the first single-mode optical fibre SM1 as an output of the device 1.

A light source S with a luminous flux is positioned at the input of the device 1. Preferably, the light source S comes from an optical fibre. It may be polarized or not polarized. At least part of the light flux enters the upstream end 41 of the first single-mode fibre SM1, forming an input signal SE propagating in the first single-mode fibre SM1. The input signal SE has the same polarization degree and the same polarization nature as the light source S. After propagation in the first single-mode optical fibre SM1, the light propagates in the polarizing optical fibre PZ of the device 1. The signal propagating in the polarizing optical fibre PZ is hereinafter called SZ. After propagation in the polarizing optical fibre PZ, the light propagates in the second single-mode optical fibre SM2. The light signal propagating in the second single-mode optical fibre SM2 is hereinafter called SS.

Hereinafter is described a method for the polarization filtering and for polarization orientation of a light signal using the device 1 described hereinabove and used by a user.

In a first step, according to the polarization degree and the polarization nature of the input signal SE, the user adjusts the polarization of the signal SZ filtered by the polarizing optical fibre PZ. For that purpose, the user uses the adjustment system 13 to adjust the angular orientation of the first rigid optomechanical connection area ZL1 about the first connection axis D1. The user can for example use a control portion of the light signal SS to make this adjustment, to adjust the lighting as desired, by adjusting the angular orientation of the first rigid optomechanical connection area ZL1 about the first connection axis D1.

In a second step, the user adjusts the linear polarization orientation of the light signal SS coming from the second single-mode optical fibre SM2 using the adjustment system 13 to define the angular orientation of the second rigid optomechanical connection area ZL2 about the second connection axis D2. Any polarization control system can be used to assist this adjustment, such as an analyser associated with a means for determining the light intensity downstream of the analyser (screen, sensor). Moreover, if for example, the signal SS is used as an input signal for an application device, the user can for example use the output signal of the application device to control the polarization orientation adjustment of the light signal SS.

In an embodiment in which the adjustment system 13 is motorized, a servo control of the angular orientation adjustment of the first rigid optomechanical connection area ZL1 and/or the second rigid optomechanical connection area ZL2 can be performed. The fibre-optic device 1 then comprises a servo system 5 for controlling the orientation adjustment of the first rigid optomechanical connection area ZL1 according to a first setpoint value, and/or controlling the orientation adjustment of the second rigid optomechanical connection area ZL2 according to a second setpoint value.

For example, the user wants to optimize the transmission of the light signals SE, SZ and SS through the device 1. For that purpose, the user collects a control portion of the light signal SS, of which it measures for example the lighting received by a sensor 2 (the sensor can be a photodiode or any other optical sensor). The servo system 21 comprises a control unit 23 that pilots the adjustment system 13 and a processing unit 25 that receives the signal measured by the sensor 2. In the case in which the adjustment system 13 comprises two motorized wheels 131 and 132, the control unit 23 triggers the rotation of the wheel 131, which rotates the first rigid optomechanical connection area ZL1 over a range of 180°. The processing unit 13 marks the position $P_{max}$ of the wheel 131 for which the signal measured by the sensor 2 is maximum and controls the rotation of the wheel 131 to this position $P_{max}$.

Similarly, in other cases, the user may want to adjust the power of the output signal of the device at any another value, for example, at the minimum value, or at any other target value.

In another example, when the signal SS is used as an input signal for a user device, the user wants to maintain the polarization of the light signal SS in line with the user device function. They are cases such as those in which the light signal SS is used as an input signal for an interferometer of the Mach-Zehnder type, or also an atomic interferometer system. Indeed, such devices preferentially use linearly polarized waves.

Several examples in which the second rigid optomechanical connection area ZL2 is controlled can be given. In these cases, the output signal SS is used as an input signal for the downstream device in question.

For example, when the device 1 is used as an input for an interferometric system using a linearly polarized source, the rotation of the second optomechanical connection area ZL2 can be controlled according to the fringe contrast of the interferometric system.

Another example is the efficiency measurement of polarizers. In this case, the rotation of the second optomechanical connection area ZL2 can be controlled according to the power transmitted by the polarizer tested.

In an embodiment, the user wants to use the light signal SS at the output of the device 1 as the input signal for a free-field user device. A fibre collimator 192 is then connected to the downstream end 62 of the second single-mode optical fibre SM2. The light beam coming from the fibre collimator 192 is then positioned at the input of the free-field user device.

In an embodiment, the user wants to measure the polarization degree D of the light source S. The polarization degree is defined as the proportion of the polarized light of the light source S. This ratio can be defined by $D=I_{pol}/I_{tot}$, where $I_{pol}$ is the light power of the polarized light and $I_{tot}$ is the total light power emitted by the light source S. In practice, the PER ("Polarization Extinction Ratio") can be measured to determine the polarization degree of the light source S.

To measure the polarization degree D of the light source S using the device 1, the user places a sensor of the photodiode type at the output of the downstream end $SM2_{av}$ of the second single-mode optical fibre SM2. The user adjusts the angular orientation of the first rigid optomechanical connection area ZL1 using the adjustment system 13 to obtain a maximum signal $E_{max}$ with the sensor. Then, the user adjusts the angular orientation of the first rigid optomechanical connection area ZL1 using the adjustment system 13 to obtain a minimum signal $E_{min}$ with the sensor. D is then determined by the relation $D=10*\log_{10}(E_{min}/E_{max})$.

In an embodiment, the user wants to linearly polarize a non-polarized light signal using the device 1. For that purpose, he or she uses the adjustment system 3 to adjust the orientation of the second rigid optomechanical connection area ZL2 about the second connection axis D2. The user adjusts this orientation to obtain the desired polarization direction. An analyser placed downstream from the downstream end $SM2_{av}$ of the second single-mode optical fibre SM2 can be used to adjust this orientation. This embodiment can be used in particular in interferometric applications, in which it is desired to work with a light signal of determined polarization.

One of the advantages of the device 1 in this configuration, and of the polarization filtering and polarization orientation method according to the invention, is the possibility to manipulate the polarization of an input light signal coming preferentially from an optical fibre with an all-fibre system, without problems of component alignment. The configuration in a casing 3 with at least one optical bulkhead 171 or 172 makes the device 1 compact and of convenient use, in relation also with the symmetry of the latter.

In a second part, it is considered that the device 1 does not comprise a second single-mode fibre SM2.

In this case, the second end 82 of the polarizing fibre PZ is directly integrated into a "user" device. The device 1 can be used for certain of the applications mentioned hereinabove in the case where the device 1 also comprises a second single-mode fibre SM2, where the light signal SS is used as an input signal for an interferometer of the Mach-Zehnder type, or also an atomic interferometer system. Indeed, such devices preferentially use linearly polarized waves.

Figure 15:
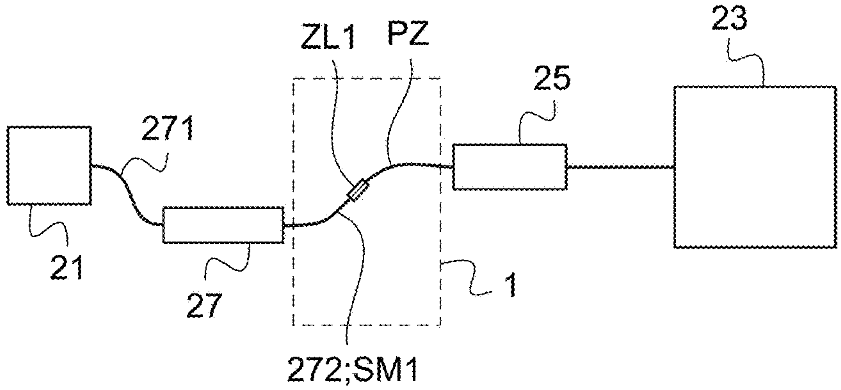
FIG. 15 illustrates a use of the fibre-optic polarization filtering and orientation device according to the embodiment of FIG. 2 in a fibre gyroscope.

A particular example is that of the integration of the device 1 in a fibre gyroscope. The configuration of a fibre gyroscope can be found in the book "The Fiber-Optic Gyroscope", by H. Lefèvre. FIG. 15 illustrates the integration of the device 1 according to the invention in the fibre gyroscope. A fibre gyroscope measures the phase-shift between two counter-propagating light signals propagating in a Sagnac interferometer 23 and coming from a light source 21. For example, the light source is a linearly polarized laser diode. Typically, the light source is connected to an optical coupler 27 coupling the source by an upstream optical fibre 271 to an input/output port 25 by a downstream single-mode fibre 272. The downstream input/output port 25 is coupled to the Sagnac interferometer 23 via an optical splitter (not shown) defining the two input arms of the Sagnac interferometer 23. The light wave arriving to the downstream input/output port has to be linearly polarized. Thus, the polarization filtering and orientation device 1 can be inserted between the optical coupler 27 and the input/output port 25 as follows and as illustrated in FIG. 15.

The first single-mode fibre SM1 is connected to the downstream single-mode fibre of the optical coupler. The first single-mode fibre SM1 is welded to a first end 83 of a polarizing fibre PZ in accordance with the structure of the device 1, forming a first rigid optomechanical connection area ZL1 along a first connection axis. The first rigid optomechanical connection area ZL1 is covered with a splice protection. A wheel 131 in which the splice protection is inserted allows an angular adjustment about the first connection axis. The second end 82 of the polarizing fibre PZ is connected to the input/output port 25 (which is an integrated optical component). A user of the fibre-optic gyroscope can adjust the angular orientation of the first rigid optomechanical connection area ZL1 in such a way as to limit the losses towards the input/output port.

Therefore, the device 1 that does not comprise second single-mode fibre SM2 also operates when the second end 82 of the polarizing fibre PZ is frozen by another optical device (integrated optics component as in the example of the fibre gyroscope, or also polarization-maintaining fibre).

Alternative Embodiments

The present invention is not in any way limited to the embodiments described and shown, but the person skilled in the art will know how to apply any variant in accordance with the invention.

Therefore, in an alternative embodiment, when the device 1 comprises a second single-mode fibre SM2, the polarizing optical fibre PZ is not arranged as a loop but in straight line between the first rigid optomechanical connection area ZL1 and the second rigid optomechanical connection area ZL2.

An example of adjustment system 13 comprising a first wheel 131, and as the case may be, a second wheel 132, has been shown. However, any other adjustment system could be used.

The invention claimed is:

1. A fiber-optic polarization filtering and orientation device comprising:

- a first single-mode optical fiber, having an upstream end and a downstream end, the upstream end of the first single-mode optical fiber being configured to receive a portion of a light flux forming an input light signal propagating in the first single-mode optical fiber, the first single-mode optical fiber being neither a polarizing optical fiber nor a polarization-maintaining fiber;
- a polarizing optical fiber, having a first end and a second end, the polarizing optical fiber being configured to transmit a light flux having a linear polarization along a polarization axis and to attenuate the linear polarization along another polarization axis;
- a first rigid optomechanical connection area connecting the downstream end of the first single-mode optical fiber and the first end of the polarizing optical fiber along a first connection axis; and
- a system configured to adjust the orientation of the first rigid optomechanical connection area about the first connection axis, the system being configured to adjust the angular position of the first rigid optomechanical connection area about the first connection axis.

2. The fiber-optic polarization filtering and orientation device according to claim 1, wherein the first rigid optomechanical connection area is formed by welding.

3. The fiber-optic polarization filtering and orientation device according to claim 2, wherein the first rigid optomechanical connection area is covered with a splice protection.

4. The fiber-optic polarization filtering and orientation device according to claim 1, wherein the polarizing optical fiber has a birefringence and a main signal loss rate along a main polarization axis $A_p$ and a transverse signal loss rate along a transverse polarization axis $A_t$, where the transverse signal loss rate is higher by at least 20 dB than the main signal loss rate.

5. The fiber-optic polarization filtering and orientation device according to claim 1, further comprising:

- a second single-mode optical fiber, having an upstream end; and
- a second rigid optomechanical connection area connecting the second end of the polarizing optical fiber and the upstream end of the second single-mode optical fiber along a second connection axis,
- wherein the orientation adjustment system is configured to adjust the angular position of the second connection area about the second connection axis.

6. The fiber-optic polarization filtering and orientation device according to claim 5, wherein the polarizing optical fiber is arranged as a loop.

7. The fiber-optic polarization filtering and orientation device according to claim 5, wherein the polarizing optical fiber has a length between 1 and 30 meters.

8. The fiber-optic polarization filtering and orientation device according to claim 5, further comprising:

- a casing;
- a first connection opening comprising an optical bulkhead; and
- a second connection opening comprising one of another optical bulkhead and a collimator for optical fiber.

9. The fiber-optic polarization filtering and orientation device according to claim 5, further comprising a servo system configured to control the orientation adjustment of at least one of the first rigid optomechanical connection area and the second rigid optomechanical connection area according to a setpoint value.

10. The fiber-optic polarization filtering and orientation device according to claim 1, wherein the orientation adjustment system is motorized.

11. A method for the polarization filtering and orientation of an input light signal, implemented by the fiber-optic polarization filtering and orientation device according to claim 1, comprising:

- positioning an optical system providing a light flux at the input of the first single-mode fiber, at least a portion of whose light flux forms an input light signal entering and propagating into the first single-mode fiber; and
- selecting a polarization of the input light signal to be filtered by adjusting the orientation of the first rigid optomechanical connection area about the first connection axis.

12. The polarization filtering and orientation method according to claim 11, wherein the method is implemented in a fiber-optic gyroscope comprising:

- a light source,
- a Sagnac interferometer,
- an input/output port coupled to said Sagnac interferometer, and
- an optical coupler coupling, upstream, using an upstream fiber, the light source to said downstream input/output port, using a downstream single-mode fiber,
- wherein:
  - the optical system comprises said optical coupler and the light source,
  - the first single-mode fiber is connected to the downstream single-mode fiber of the optical coupler, and
  - the polarizing fiber of the fiber-optic polarization filtering and orientation device is connected to the input/output port.

13. A method for the polarization filtering of an input light signal and the polarization orientation of an output light signal, implemented by the fiber-optic polarization filtering and orientation device according to claim 5, the method comprising:

- positioning an optical system providing a light flux at the input of the first single-mode fiber, at least a portion of the light flux forming an input light signal entering and propagating into the first single-mode fiber, then into the polarizing fiber;

selecting a polarization of the input light signal to be filtered by adjusting the orientation of the first rigid optomechanical connection area about the first connection axis; and selecting the polarization orientation of the output light signal by adjusting the orientation of the second rigid optomechanical connection area about the second connection axis.

* * * * *